United States Patent
Yu et al.

(10) Patent No.: US 11,350,362 B2
(45) Date of Patent: *May 31, 2022

(54) DOWNLINK SCHEDULING DATA MONITORING METHOD, DOWNLINK SCHEDULING DATA SENDING METHOD, AND APPARATUS

(71) Applicant: HUAWEI TECHNOLOGIES CO., LTD., Shenzhen (CN)

(72) Inventors: Yinghui Yu, Beijing (CN); Lei Liu, Shanghai (CN); Feng Yu, Beijing (CN); Xiaolei Tie, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 27 days.

This patent is subject to a terminal disclaimer.

(21) Appl. No.: 16/885,306

(22) Filed: May 28, 2020

(65) Prior Publication Data

US 2020/0367162 A1 Nov. 19, 2020

Related U.S. Application Data

(63) Continuation of application No. 15/817,266, filed on Nov. 19, 2017, now Pat. No. 10,694,462, which is a (Continued)

(30) Foreign Application Priority Data

May 19, 2015 (CN) .......................... 201510257300.2

(51) Int. Cl.
*H04W 52/02* (2009.01)
*H04W 72/12* (2009.01)
*H04W 76/28* (2018.01)

(52) U.S. Cl.
CPC ... *H04W 52/0225* (2013.01); *H04W 52/0206* (2013.01); *H04W 52/0216* (2013.01);
(Continued)

(58) Field of Classification Search
CPC ......... H04W 52/0206; H04W 52/0216; H04W 52/0225; H04W 72/12; H04W 76/28; Y02D 30/70
See application file for complete search history.

(56) References Cited

U.S. PATENT DOCUMENTS 9,374,845 B2 * 6/2016 Xu ........................... H04L 47/27
9,439,236 B2 * 9/2016 Miklos .................. H04W 76/28
(Continued)

FOREIGN PATENT DOCUMENTS

CN 101675610 A 3/2010
CN 103843415 A 6/2014
(Continued)

OTHER PUBLICATIONS

R2-152638 Alcatel-Lucent et al,"Supporting eCDRX in RRC connected state", 3GPP TSG-RAN WG2 Meeting #90, Fukuoka, Japan, May 25-29, 2015, total 4 pages.

*Primary Examiner* — Ahmed Elallam
(74) *Attorney, Agent, or Firm* — Rimon PC

(57) ABSTRACT

A downlink scheduling data monitoring method, a downlink scheduling data sending method, and an apparatus are provided. The method includes: starting a timer; and after it is determined that the timer expires, monitoring, by using a first discontinuous reception DRX monitoring cycle, downlink scheduling data sent by a base station, where duration of the first DRX monitoring cycle is in a unit of minute or hour. After it is determined that the timer expires, the downlink scheduling data is monitored by using the first DRX monitoring cycle whose duration is in a unit of minute
(Continued)

```
┌─────────────────────────────────────────────────────┐
│ Receive downlink scheduling data sent by a core     │
│ network device to a terminal                        │── 400
└─────────────────────────────────────────────────────┘
                        │
                        ▼
┌─────────────────────────────────────────────────────┐
│ When it is determined that the terminal monitors    │
│ the downlink scheduling data by using a first DRX   │
│ monitoring cycle, send the downlink scheduling data │── 410
│ to the terminal by using a first sending cycle,     │
│ where duration of the first sending cycle is in a   │
│ unit of minute or hour                              │
└─────────────────────────────────────────────────────┘
``` or hour. In this way, not only power consumption is reduced, but also the downlink scheduling data can be monitored.

19 Claims, 5 Drawing Sheets

Related U.S. Application Data continuation of application No. PCT/CN2016/075805, filed on Mar. 7, 2016.

(52) U.S. Cl.
CPC ........... *H04W 72/12* (2013.01); *H04W 76/28* (2018.02); *Y02D 30/70* (2020.08)

(56) References Cited

U.S. PATENT DOCUMENTS

| | | | |
|---|---|---|---|
| 9,510,287 B2* | 11/2016 | Lu | H04W 72/14 |
| 9,883,482 B2* | 1/2018 | Johansson | H04W 68/02 |
| 10,051,565 B2* | 8/2018 | Larmo | H04W 36/0088 |
| 10,051,570 B2* | 8/2018 | Vos | H04W 4/70 |
| 10,172,183 B2* | 1/2019 | Diachina | H04W 52/0216 |
| 10,420,028 B2* | 9/2019 | Rahman | H04W 76/28 |
| 10,531,386 B2* | 1/2020 | Nagasaka | H04W 72/042 |
| 10,694,462 B2* | 6/2020 | Yu | H04W 52/0216 |
| 11,032,870 B2* | 6/2021 | Olvera-Hernandez | H04W 52/0216 |
| 2010/0034142 A1 | 2/2010 | Harris et al. | |
| 2011/0039536 A1 | 2/2011 | Lee et al. | |
| 2013/0136072 A1 | 5/2013 | Bachmann et al. | |
| 2013/0201920 A1 | 8/2013 | Takano | |
| 2013/0223307 A1 | 8/2013 | Ohlsson et al. | |
| 2013/0315122 A1 | 11/2013 | Sirotkin et al. | |
| 2014/0119255 A1* | 5/2014 | Vannithamby | H04W 76/28 370/311 |
| 2014/0286215 A1 | 9/2014 | Koc et al. | |
| 2014/0307606 A1 | 10/2014 | Cai et al. | |
| 2015/0173122 A1 | 6/2015 | Schliwa-Bertling et al. | |
| 2016/0057738 A1* | 2/2016 | Lee | H04W 72/042 370/329 |
| 2016/0227601 A1* | 8/2016 | Haneji | H04W 76/28 |
| 2016/0270028 A1 | 9/2016 | Lee et al. | |

FOREIGN PATENT DOCUMENTS

| | | |
|---|---|---|
| CN | 103889039 A | 6/2014 |
| CN | 104303586 A | 1/2015 |
| EP | 2787773 B1 | 1/2020 |
| JP | 2012124602 A | 6/2012 |
| JP | 2013524563 A | 6/2013 |
| JP | 2016535506 A | 11/2016 |
| WO | 2013080764 A1 | 6/2013 |
| WO | 2015065041 A1 | 5/2015 |

\* cited by examiner

DOWNLINK SCHEDULING DATA MONITORING METHOD, DOWNLINK SCHEDULING DATA SENDING METHOD, AND APPARATUS

CROSS-REFERENCE TO RELATED APPLICATIONS

This application is a continuation of U.S. patent application Ser. No. 15/817,266, filed on Nov. 19, 2017, which is a continuation of International Application No. PCT/CN2016/075805, filed on Mar. 7, 2016. The International Application claims priority to Chinese Patent Application No. 201510257300.2, filed on May 19, 2015. All of the aforementioned patent applications are hereby incorporated by reference in their entireties.

TECHNICAL FIELD

The present invention relates to the field of communications technologies, and in particular, to a downlink scheduling data monitoring method, a downlink scheduling data sending method, and an apparatus.

BACKGROUND

With development of communications technologies, an machine-to-machine (M2M) communications system emerges. As shown in FIG. 1, the M2M communications system is a network-based system architecture focusing on intelligent interaction between devices. An M2M technology provides a means of real-time data transmission between systems, remote devices, and/or individuals, and a wireless communications module is built inside a device in the M2M communications system, to implement functions such as performing monitoring, commanding and dispatching, data collection, and measurement on the device.

Currently, the M2M communications system is widely applied to many scenarios, such as smart metering, environment monitoring, and remote monitoring. For example, in a smart metering scenario, a device in the M2M communications system needs to periodically monitor and report use of water, electricity, and gas. When a user does not pay bills, the device remotely cuts off energy supply, and may update subscription information after a house tenant changes.

In a running process, the device in the M2M communications system needs to monitor downlink scheduling data, and the device in the M2M communications system is powered by a battery. If the device is always in a state of monitoring the downlink scheduling data, power consumption of the device is relatively large; or if the device is always in a state of not monitoring the downlink scheduling data, the downlink scheduling data cannot be received in a timely manner. During monitoring of downlink scheduling data, it is apparently inappropriate to consider only timely receiving of the downlink scheduling data without considering power consumption of a device. Likewise, it is also apparently inappropriate to consider only power consumption of a device without considering timely receiving of the downlink scheduling data.

Therefore, how to better balance a relationship between power saving of a device and timely receiving of downlink scheduling data is an urgent problem that needs to be resolved in the M2M communications system.

SUMMARY

Embodiments of the present invention provide a downlink scheduling data monitoring method, a downlink scheduling data sending method, and an apparatus, so as to reduce power consumption of a device in an M2M communications system without affecting timely receiving of downlink scheduling data by the device, and better balance a relationship between power saving of the device and timely receiving of the downlink scheduling data.

According to a first aspect, a downlink scheduling data monitoring method is provided, including:

starting a timer; and after it is determined that the timer expires, monitoring, by using a first discontinuous reception DRX monitoring cycle, downlink scheduling data sent by a base station, where duration of the first DRX monitoring cycle is in a unit of minute or hour.

With reference to the first aspect, in a first possible implementation, the monitoring, by using a first DRX monitoring cycle, downlink scheduling data sent by the base station includes:

monitoring, by using the first DRX monitoring cycle according to a scheduling identifier in an idle state or a scheduling identifier in a connected state, the downlink scheduling data sent by the base station.

With reference to the first aspect or the first possible implementation of the first aspect, in a second possible implementation, before the monitoring, by using a first DRX monitoring cycle, downlink scheduling data sent by a base station, the method further includes:

receiving a first DRX monitoring cycle that is sent by the base station in a broadcast manner or a dedicated signaling manner and that is supported by the base station, and using the first DRX monitoring cycle supported by the base station as the first DRX monitoring cycle; or receiving a first DRX monitoring cycle that is sent by the base station in a broadcast manner or a dedicated signaling manner and that is supported by the base station, and using a minimum DRX monitoring cycle or a maximum DRX monitoring cycle in the first DRX monitoring cycle supported by the base station and a first DRX monitoring cycle supported by the terminal as the first DRX monitoring cycle; or using a first DRX monitoring cycle reported by a terminal as the first DRX monitoring cycle.

With reference to the first aspect or the first to the second possible implementations of the first aspect, in a third possible implementation, the timer includes a ready timer (Ready Timer), and the ready timer is configured to determine that the terminal is switched from a ready state to a standby state.

With reference to the third possible implementation of the first aspect, in a fourth possible implementation, the timer further includes a reduced downlink control signal reception RDR timer, and the RDR timer is configured to determine that the terminal is switched from a connected state to a long sleep state;

the starting a timer includes:

starting the ready timer and the RDR timer, where a time of starting the ready timer is earlier than a time of starting the RDR timer; and the determining that the timer expires includes:

determining that the ready timer expires.

With reference to the first aspect or the first to the second possible implementations of the first aspect, in a fifth possible implementations, the timer includes an RDR timer, and the RDR timer is configured to determine that the terminal is switched from a connected state to a long sleep state;

before the monitoring, by using a first DRX monitoring cycle, downlink scheduling data sent by the base station, the method further includes:

determining an initial monitoring moment; and determining a DRX monitoring moment according to the initial monitoring moment, where the DRX monitoring moment is a moment at a distance of N first DRX monitoring cycles from the initial monitoring moment, and N is a positive integer greater than or equal to 0; and the monitoring, by using a first DRX monitoring cycle, downlink scheduling data sent by the base station includes:

monitoring, at the DRX monitoring moment, the downlink scheduling data sent by the base station.

With reference to the fifth possible implementation of the first aspect, in a sixth possible implementation, the determining an initial monitoring moment includes:

determining the initial monitoring moment according to an identifier of the terminal and the first DRX monitoring cycle; or using an end moment of the RDR timer as the initial monitoring moment.

With reference to the first aspect or the first to sixth possible implementations of the first aspect, in a seventh possible implementation, after the starting a timer, the method further includes:

when it is determined that the timer does not expire, monitoring, by using a second DRX monitoring cycle, the downlink scheduling data sent by the base station, where duration of the second DRX monitoring cycle is in a unit of millisecond or second.

With reference to the seventh possible implementation of the first aspect, in an eighth possible implementation, before the monitoring, by using a second DRX monitoring cycle, the downlink scheduling data sent by the base station, the method further includes:

receiving a second DRX monitoring cycle that is sent by the base station in a broadcast manner or a dedicated signaling manner and that is supported by the base station, and using the second DRX monitoring cycle supported by the base station as the second DRX monitoring cycle; or receiving a second DRX monitoring cycle that is sent by the base station in a broadcast manner or a dedicated signaling manner and that is supported by the base station, and using a minimum DRX monitoring cycle or a maximum DRX monitoring cycle in the second DRX monitoring cycle supported by the base station and a second DRX monitoring cycle supported by the terminal as the second DRX monitoring cycle; or using a second DRX monitoring cycle reported by the terminal as the second DRX monitoring cycle.

With reference to the seventh or the eighth possible implementation of the first aspect, in a ninth possible implementation, the timer includes a ready timer, and the ready timer is configured to determine that the terminal is switched from a ready state to a standby state; and the monitoring, by using a second DRX monitoring cycle, the downlink scheduling data sent by the base station includes:

monitoring, by using the second DRX monitoring cycle according to a scheduling identifier in an idle state, the downlink scheduling data sent by the base station.

With reference to the seventh or the eighth possible implementation of the first aspect, in a tenth possible implementation, the timer includes an RDR timer, and the RDR timer is configured to determine that the terminal is switched from a connected state to a long sleep state; and the monitoring, by using a second DRX monitoring cycle, the downlink scheduling data sent by the base station includes:

monitoring, by using the second DRX monitoring cycle according to a scheduling identifier in a connected state, the downlink scheduling data sent by the base station.

With reference to the seventh or the eighth possible implementation of the first aspect, in an eleventh possible implementation, the timer includes a ready timer and an RDR timer, the ready timer is configured to determine that the terminal is switched from a ready state to a standby state, and the RDR timer is configured to determine that the terminal is switched from a connected state to a long sleep state;

the starting a timer includes:

starting the ready timer and the RDR timer, where a time of starting the ready timer is earlier than a time of starting the RDR timer; and the determining that the timer does not expire includes:

determining that the ready timer does not expire.

With reference to the eleventh possible implementation of the first aspect, in a twelfth possible implementation, after the determining that the timer does not expire, and before the monitoring, by using a second DRX monitoring cycle, the downlink scheduling data sent by the base station, the method further includes:

determining that the RDR timer does not expire; and the monitoring, by using a second DRX monitoring cycle, the downlink scheduling data sent by the base station includes:

monitoring, by using the second DRX monitoring cycle according to a scheduling identifier in a connected state, the downlink scheduling data sent by the base station.

With reference to the eleventh possible implementation of the first aspect, in a thirteenth possible implementation, after the determining that the timer does not expire, the method further includes:

determining that the RDR timer expires; and monitoring, by using a third DRX monitoring cycle according to a scheduling identifier in an idle state, the downlink scheduling data sent by the base station, where duration of the third DRX monitoring cycle is in a unit of millisecond or second.

With reference to the thirteenth possible implementation of the first aspect, in a fourteenth possible implementation, before the monitoring, by using a third DRX monitoring cycle, the downlink scheduling data sent by the base station, the method further includes:

receiving a third DRX monitoring cycle that is sent by the base station in a broadcast manner or a dedicated signaling manner and that is supported by the base station, and using the third DRX monitoring cycle supported by the base station as the third DRX monitoring cycle; or receiving a third DRX monitoring cycle that is sent by the base station in a broadcast manner or a dedicated signaling manner and that is supported by the base station, and using a maximum DRX cycle or a minimum DRX cycle in the third DRX monitoring cycle supported by the base station and a third DRX monitoring cycle supported by the terminal as the third DRX monitoring cycle; or using a third DRX monitoring cycle reported by the terminal as the third DRX monitoring cycle.

With reference to the third to the fourteenth possible implementations of the first aspect, in a fifteenth possible implementation, the starting a timer includes: starting the ready timer and/or the RDR timer, where the ready timer is configured to determine that the terminal is switched from a ready state to a standby state, and the RDR timer is configured to determine that the terminal is switched from a connected state to a long sleep state.

With reference to the fifteenth possible implementation of the first aspect, in a sixteenth possible implementation, the starting the ready timer includes: starting the ready timer when a last uplink logical link control LLC data packet is sent; and the starting the RDR timer includes:

starting the RDR timer when positive feedback information for a last uplink Media Access Control (MAC) layer data packet is received.

According to a second aspect, a downlink scheduling data sending method is provided, including:

receiving downlink scheduling data sent by a core network device to a terminal; and when it is determined that the terminal monitors the downlink scheduling data by using a first discontinuous reception DRX monitoring cycle, sending the downlink scheduling data to the terminal by using a first sending cycle, where duration of the first sending cycle is in a unit of minute or hour.

With reference to the second aspect, in a first possible implementation, the determining that the terminal monitors the downlink scheduling data by using a first DRX monitoring cycle includes:

determining, according to the first DRX monitoring cycle carried in the downlink scheduling data, that the terminal monitors the downlink scheduling data by using the first DRX monitoring cycle; or when it is determined that the downlink scheduling data is a paging message, determining that the terminal monitors the downlink scheduling data by using the first DRX monitoring cycle.

With reference to the second aspect or the first possible implementation of the second aspect, in a second possible implementation, before the sending the downlink scheduling data to the terminal by using a first sending cycle, the method further includes:

receiving a last uplink MAC layer data packet sent by the terminal; and sending positive feedback information for the last uplink MAC layer data packet to the terminal, and starting a reduced downlink control signal reception RDR timer, where the RDR timer is configured to determine that the terminal is switched from a connected state to a long sleep state; and the determining that the terminal monitors the downlink scheduling data by using a first DRX monitoring cycle includes:

when it is determined that the RDR timer expires, determining that the terminal monitors the downlink scheduling data by using the first DRX monitoring cycle.

With reference to the second aspect or the first to the second possible implementations of the second aspect, in a third possible implementation, before the sending the downlink scheduling data to the terminal by using a first sending cycle, the method further includes:

sending the first DRX monitoring cycle to the terminal in a broadcast manner or a dedicated signaling manner; or sending, in a broadcast manner or a dedicated signaling manner, a first DRX monitoring cycle supported by a base station to the terminal; and/or sending, in a form of uplink data at a logical link control layer, the first DRX monitoring cycle supported by the base station to the core network device.

With reference to the third possible implementation of the second aspect, in a fourth possible implementation, before the sending the downlink scheduling data to the terminal by using a first sending cycle, the method further includes:

determining an initial sending moment;

determining a DRX sending moment according to the initial sending moment, where the DRX sending moment is a moment at a distance of N first sending cycles from the initial sending moment, and N is a positive integer greater than or equal to 0; and sending the downlink scheduling data at the DRX sending moment.

With reference to the second aspect or the first to the second possible implementations of the second aspect, in a fifth possible implementation, the determining an initial sending moment includes:

determining the initial sending moment according to an identifier of the terminal and the first sending cycle; or using an end moment of the RDR timer as the initial sending moment, where the RDR timer is configured to determine that the terminal is switched from a connected state to a long sleep state.

With reference to the fifth possible implementation of the second aspect, in a sixth possible implementation, before the determining that the terminal monitors the downlink scheduling data by using a first DRX monitoring cycle, the method further includes:

determining that the terminal monitors the downlink scheduling data by using a second DRX monitoring cycle, and sending the downlink scheduling data to the terminal by using a second sending cycle, where duration of the second sending cycle is in a unit of millisecond or second.

With reference to the second aspect or the first to the sixth possible implementations of the second aspect, in a seventh possible implementation, the determining that the terminal monitors the downlink scheduling data by using a second DRX monitoring cycle includes:

determining, according to the second DRX monitoring cycle carried in the downlink scheduling data, that the terminal monitors the downlink scheduling data by using the second DRX monitoring cycle; or when it is determined that the downlink scheduling data is downlink data, determining that the terminal monitors the downlink scheduling data by using the second DRX monitoring cycle.

With reference to the seventh possible implementation of the second aspect, in an eighth possible implementation, before the sending the downlink scheduling data to the terminal by using a second sending cycle, the method further includes:

receiving a last uplink MAC layer data packet sent by the terminal; and sending positive feedback information for the last uplink MAC layer data packet to the terminal, and starting an RDR timer, where the RDR timer is configured to determine that the terminal is switched from a connected state to a long sleep state; and the determining that the terminal monitors the downlink scheduling data by using a second DRX monitoring cycle includes:

when it is determined that the downlink scheduling data is downlink data, and the RDR timer does not expire, determining that the terminal monitors the downlink scheduling data by using the second DRX monitoring cycle.

With reference to the seventh or the eighth possible implementation of the second aspect, in a ninth possible implementation, before the sending the downlink scheduling data to the terminal by using a second sending cycle, the method further includes:

sending the second DRX monitoring cycle to the terminal in a broadcast manner or a dedicated signaling manner; or sending, in a broadcast manner or a dedicated signaling manner, a second DRX monitoring cycle supported by the base station to the terminal; and/or sending, in a form of uplink data at a logical link control layer, the second DRX monitoring cycle supported by the base station to the core network device.

With reference to the seventh or the eighth possible implementation of the second aspect, in a tenth possible implementation, before the sending the downlink scheduling data to the terminal by using a first sending cycle, the method further includes:

when it is determined that the terminal monitors the downlink scheduling data by using a third DRX monitoring cycle, sending the downlink scheduling data to the terminal by using a third sending cycle, where duration of the third sending cycle is from a millisecond range to a second range.

With reference to the seventh or the eighth possible implementation of the second aspect, in an eleventh possible implementation, before the determining that the terminal monitors the downlink scheduling data by using a third DRX monitoring cycle, the method further includes:

receiving a last uplink MAC layer data packet sent by the terminal; and sending positive feedback information for the last uplink MAC layer data packet to the terminal, and starting an RDR timer, where the RDR timer is configured to determine that the terminal is switched from a connected state to a long sleep state; and the determining that the terminal monitors the downlink scheduling data by using a third DRX monitoring cycle includes:

when it is determined that the downlink scheduling data is downlink data, and the RDR timer expires, determining that the terminal monitors the downlink scheduling data by using the third DRX monitoring cycle.

With reference to the eleventh possible implementation of the second aspect, in a twelfth possible implementation, before the determining that the terminal monitors the downlink scheduling data by using a third DRX monitoring cycle, the method further includes:

sending the third DRX monitoring cycle to the terminal in a broadcast manner or a dedicated signaling manner; and/or sending the third DRX monitoring cycle to the core network device in a form of uplink data at a logical link control layer.

According to a third aspect, a terminal is provided, including:

a starting unit, configured to start a timer;

a determining unit, configured to determine that the timer expires; and a monitoring unit, configured to: after the determining unit determines that the timer expires, monitor, by using a first discontinuous reception DRX monitoring cycle, downlink scheduling data sent by a base station, where duration of the first DRX monitoring cycle is in a unit of minute or hour.

With reference to the third aspect, in a first possible implementation, the monitoring unit is configured to:

monitor, by using the first DRX monitoring cycle according to a scheduling identifier in an idle state or a scheduling identifier in a connected state, the downlink scheduling data sent by the base station.

With reference to the third aspect or the first possible implementation of the third aspect, in a second possible implementation, the terminal further includes a receiving unit, the receiving unit is configured to receive a first DRX monitoring cycle that is sent by the base station in a broadcast manner or a dedicated signaling manner and that is supported by the base station, and the determining unit is further configured to use the first DRX monitoring cycle supported by the base station as the first DRX monitoring cycle; or the receiving unit is configured to receive a first DRX monitoring cycle that is sent by the base station in a broadcast manner or a dedicated signaling manner and that is supported by the base station, and the determining unit is further configured to use a minimum DRX monitoring cycle or a maximum DRX monitoring cycle in the first DRX monitoring cycle supported by the base station and a first DRX monitoring cycle supported by the terminal as the first DRX monitoring cycle; or the determining unit is further configured to use a first DRX monitoring cycle reported by the terminal as the first DRX monitoring cycle.

With reference to the third aspect or the first to the second possible implementations of the third aspect, in a third possible implementation, the timer includes a ready timer (Ready Timer), and the ready timer is configured to determine that the terminal is switched from a ready state to a standby state.

With reference to the third possible implementation of the third aspect, in a fourth possible implementation, the timer further includes a reduced downlink control signal reception RDR timer, and the RDR timer is configured to determine that the terminal is switched from a connected state to a long sleep state;

the starting unit is configured to start the ready timer and the RDR timer, where a time of starting the ready timer is earlier than a time of starting the RDR timer; and the determining unit is configured to determine that the ready timer expires.

With reference to the third aspect or the first to the second possible implementations of the third aspect, in a fifth possible implementation, the timer includes an RDR timer, and the RDR timer is configured to determine that the terminal is switched from a connected state to a long sleep state;

the determining unit is further configured to: determine an initial monitoring moment; and determine a DRX monitoring moment according to the initial monitoring moment, where the DRX monitoring moment is a moment at a distance of N first DRX monitoring cycles from the initial monitoring moment, and N is a positive integer greater than or equal to 0; and the monitoring unit is configured to monitor, at the DRX monitoring moment, the downlink scheduling data sent by the base station.

With reference to the fifth possible implementation of the third aspect, in a sixth possible implementation, that the determining unit determines an initial monitoring moment is:

determining the initial monitoring moment according to an identifier of the terminal and the first DRX monitoring cycle; or using an end moment of the RDR timer as the initial monitoring moment.

With reference to the third aspect or the first to the sixth possible implementations of the third aspect, in a seventh possible implementation, the determining unit is further configured to determine that the timer does not expire; and the monitoring unit is further configured to: when the determining unit determines that the timer does not expire, monitor, by using a second DRX monitoring cycle, the downlink scheduling data sent by the base station, where duration of the second DRX monitoring cycle is in a unit of millisecond or second.

With reference to the seventh possible implementation of the third aspect, in an eighth possible implementation, the terminal further includes a receiving unit, the receiving unit is configured to receive a second DRX monitoring cycle that is sent by the base station in a broadcast manner or a dedicated signaling manner and that is supported by the base station, and the determining unit is further configured to use the second DRX monitoring cycle supported by the base station as the second DRX monitoring cycle; or the receiving unit is further configured to receive a second DRX monitoring cycle that is sent by the base station in a broadcast manner or a dedicated signaling manner and that is supported by the base station, and the determining unit is further configured to use a minimum DRX monitoring cycle or a maximum DRX monitoring cycle in the second DRX monitoring cycle supported by the base station and a second DRX monitoring cycle supported by the terminal as the second DRX monitoring cycle; or the determining unit is further configured to use a second DRX monitoring cycle reported by the terminal as the second DRX monitoring cycle.

With reference to the seventh or the eighth possible implementation of the third aspect, in a ninth possible implementation, the timer includes a ready timer, and the ready timer is configured to determine that the terminal is switched from a ready state to a standby state; and the monitoring unit is configured to monitor, by using the second DRX monitoring cycle according to a scheduling identifier in an idle state, the downlink scheduling data sent by the base station.

With reference to the seventh or the eighth possible implementation of the third aspect, in a tenth possible implementation, the timer includes an RDR timer, and the RDR timer is configured to determine that the terminal is switched from a connected state to a long sleep state; and the monitoring unit is configured to monitor, by using the second DRX monitoring cycle according to a scheduling identifier in a connected state, the downlink scheduling data sent by the base station.

With reference to the seventh or the eighth possible implementation of the third aspect, in an eleventh possible implementation, the timer includes a ready timer and an RDR timer, the ready timer is configured to determine that the terminal is switched from a ready state to a standby state, and the RDR timer is configured to determine that the terminal is switched from a connected state to a long sleep state; the starting unit is configured to start the ready timer and the RDR timer, where a time of starting the ready timer is earlier than a time of starting the RDR timer; and that the determining unit determines that the timer does not expire is:

determining that the ready timer does not expire.

With reference to the eleventh possible implementation of the third aspect, in a twelfth possible implementation, the determining unit is further configured to determine that the RDR timer does not expire; and the monitoring unit is configured to monitor, by using the second DRX monitoring cycle according to a scheduling identifier in a connected state, the downlink scheduling data sent by the base station.

With reference to the eleventh possible implementation of the third aspect, in a thirteenth possible implementation, the determining unit is further configured to determine that the RDR timer expires; and the monitoring unit is further configured to monitor, by using a third DRX monitoring cycle according to a scheduling identifier in an idle state, the downlink scheduling data sent by the base station, where duration of the third DRX monitoring cycle is in a unit of millisecond or second.

With reference to the thirteenth possible implementation of the third aspect, in a fourteenth possible implementation, the terminal further includes a receiving unit, the receiving unit is configured to receive a third DRX monitoring cycle that is sent by the base station in a broadcast manner or a dedicated signaling manner and that is supported by the base station, and the determining unit is further configured to use the third DRX monitoring cycle supported by the base station as the third DRX monitoring cycle; or the receiving unit is further configured to receive a third DRX monitoring cycle that is sent by the base station in a broadcast manner or a dedicated signaling manner and that is supported by the base station, and the determining unit is further configured to use a maximum DRX cycle or a minimum DRX cycle in the third DRX monitoring cycle supported by the base station and a third DRX monitoring cycle supported by the terminal as the third DRX monitoring cycle; or the determining unit is further configured to use a third DRX monitoring cycle reported by the terminal as the third DRX monitoring cycle.

With reference to the third to the fourteenth possible implementations of the third aspect, in a fifteenth possible implementation, the starting unit is configured to start the ready timer and/or the RDR timer, the ready timer is configured to determine that the terminal is switched from a ready state to a standby state, and the RDR timer is configured to determine that the terminal is switched from a connected state to a long sleep state.

With reference to the fifteenth possible implementation of the third aspect, in a sixteenth possible implementation, that the starting unit starts the ready timer is:

starting the ready timer when a last uplink logical link control LLC data packet is sent; and that the starting unit starts the RDR timer is:

starting the RDR timer when positive feedback information for a last uplink MAC layer data packet is received.

According to a fourth aspect, a base station is provided, including:

a receiving unit, configured to receive downlink scheduling data sent by a core network device to a terminal;

a determining unit, configured to determine that the terminal monitors the downlink scheduling data by using a first discontinuous reception DRX monitoring cycle; and a sending unit, configured to: when the determining unit determines that the terminal monitors the downlink scheduling data by using the first discontinuous reception DRX monitoring cycle, send the downlink scheduling data to the terminal by using a first sending cycle, where duration of the first sending cycle is in a unit of minute or hour.

With reference to the fourth aspect, in a first possible implementation, the determining unit is configured to: determine, according to the first DRX monitoring cycle carried in the downlink scheduling data, that the terminal monitors the downlink scheduling data by using the first DRX monitoring cycle; or when determining that the downlink scheduling data is a paging message, determine that the terminal monitors the downlink scheduling data by using the first DRX monitoring cycle.

With reference to the fourth aspect or the first possible implementation of the fourth aspect, in a second possible implementation, the receiving unit is further configured to receive a last uplink MAC layer data packet sent by the terminal;

the sending unit is further configured to send positive feedback information for the last uplink MAC layer data packet to the terminal;

the base station further includes a starting unit, configured to start a reduced downlink control signal reception RDR timer when the sending unit sends the positive feedback information for the last uplink MAC layer data packet to the terminal, where the RDR timer is configured to determine that the terminal is switched from a connected state to a long sleep state; and the determining unit is configured to: when determining that the RDR timer expires, determine that the terminal monitors the downlink scheduling data by using the first DRX monitoring cycle.

With reference to the fourth aspect or the first to the second possible implementations of the fourth aspect, in a third possible implementation, the sending unit is further configured to: send the first DRX monitoring cycle to the terminal in a broadcast manner or a dedicated signaling manner; or send, in a broadcast manner or a dedicated signaling manner, a first DRX monitoring cycle supported by the base station to the terminal; and/or send, in a form of uplink data at a logical link control layer, the first DRX monitoring cycle supported by the base station to the core network device.

With reference to the third possible implementation of the fourth aspect, in a fourth possible implementation, the determining unit is further configured to: determine an initial sending moment; and determine a DRX sending moment according to the initial sending moment, where the DRX sending moment is a moment at a distance of N first sending cycles from the initial sending moment, and N is a positive integer greater than or equal to 0; and the sending unit is configured to send the downlink scheduling data at the DRX sending moment.

With reference to the fourth aspect or the first to the second possible implementations of the fourth aspect, in a fifth possible implementation, that the determining unit determines an initial sending moment is:

determining the initial sending moment according to an identifier of the terminal and the first sending cycle; or using an end moment of the RDR timer as the initial sending moment, where the RDR timer is configured to determine that the terminal is switched from a connected state to a long sleep state.

With reference to the fifth possible implementation of the fourth aspect, in a sixth possible implementation, the determining unit is further configured to determine that the terminal monitors the downlink scheduling data by using a second DRX monitoring cycle; and the sending unit is further configured to send the downlink scheduling data to the terminal by using a second sending cycle, where duration of the second sending cycle is in a unit of millisecond or second.

With reference to the fourth aspect or the first to the sixth possible implementations of the fourth aspect, in a seventh possible implementation, that the determining unit determines that the terminal monitors the downlink scheduling data by using a second DRX monitoring cycle is:

determining, according to the second DRX monitoring cycle carried in the downlink scheduling data, that the terminal monitors the downlink scheduling data by using the second DRX monitoring cycle; or when determining that the downlink scheduling data is downlink data, determining that the terminal monitors the downlink scheduling data by using the second DRX monitoring cycle.

With reference to the seventh possible implementation of the fourth aspect, in an eighth possible implementation, the receiving unit is further configured to receive a last uplink MAC layer data packet sent by the terminal;

the sending unit is further configured to send positive feedback information for the last uplink MAC layer data packet to the terminal;

the base station further includes a starting unit, configured to start an RDR timer when the sending unit sends the positive feedback information for the last uplink MAC layer data packet to the terminal, where the RDR timer is configured to determine that the terminal is switched from a connected state to a long sleep state; and that the determining unit determines that the terminal monitors the downlink scheduling data by using a second DRX monitoring cycle is:

when determining that the downlink scheduling data is downlink data, and the RDR timer does not expire, determining that the terminal monitors the downlink scheduling data by using the second DRX monitoring cycle.

With reference to the seventh or the eighth possible implementation of the fourth aspect, in a ninth possible implementation, the sending unit is further configured to: send the second DRX monitoring cycle to the terminal in a broadcast manner or a dedicated signaling manner; or send, in a broadcast manner or a dedicated signaling manner, a second DRX monitoring cycle supported by the base station to the terminal; and/or send, in a form of uplink data at a logical link control layer, the second DRX monitoring cycle supported by the base station to the core network device.

With reference to the seventh or the eighth possible implementation of the fourth aspect, in a tenth possible implementation, the determining unit is further configured to determine that the terminal monitors the downlink scheduling data by using a third DRX monitoring cycle; and the sending unit is further configured to: when the determining unit determines that the terminal monitors the downlink scheduling data by using the third DRX monitoring cycle, send the downlink scheduling data to the terminal by using a third sending cycle, where duration of the third sending cycle is from a millisecond range to a second range.

With reference to the seventh or the eighth possible implementation of the fourth aspect, in an eleventh possible implementation, the receiving unit is further configured to receive a last uplink MAC layer data packet sent by the terminal;

the sending unit is further configured to send positive feedback information for the last uplink MAC layer data packet to the terminal;

the base station further includes a starting unit, configured to start an RDR timer when the sending unit sends the positive feedback information for the last uplink MAC layer data packet to the terminal, where the RDR timer is configured to determine that the terminal is switched from a connected state to a long sleep state; and that the determining unit determines that the terminal monitors the downlink scheduling data by using a third DRX monitoring cycle is:

when determining that the downlink scheduling data is downlink data, and the RDR timer expires, determining that the terminal monitors the downlink scheduling data by using the third DRX monitoring cycle.

With reference to the eleventh possible implementation of the fourth aspect, in a twelfth possible implementation, the sending unit is further configured to: send the third DRX monitoring cycle to the terminal in a broadcast manner or a dedicated signaling manner; and/or send the third DRX monitoring cycle to the core network device in a form of uplink data at a logical link control layer.

In the prior art, even though a timer expires, downlink scheduling data is monitored by using a DRX monitoring cycle whose duration is in a unit of second or millisecond, and consequently, power consumption is relatively large, and a relationship between power saving of a device and timely receiving of the downlink scheduling data cannot be balanced. However, in the embodiments of the present invention, after it is determined that the timer expires, the downlink scheduling data is monitored by using the first DRX monitoring cycle whose duration is in a unit of minute or hour, and in this way, not only power consumption is reduced, but also the downlink scheduling data can be monitored.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Technologies described in this specification may be applied to various communications systems, for example, current 2G and 3G communications systems, an Long Term Evolution (LTE) communications system, and a next-generation communications system, for example, a Global System for Mobile Communications (GSM), a Code Division Multiple Access (CDMA) system, a Time Division Multiple Access (TDMA) system, a Wideband Code Division Multiple Access (WCDMA) system, an Frequency Division Multiple Access (FDMA) system, an Orthogonal Frequency Division Multiple Access (OFDMA) system, a single-carrier FDMA (SC-FDMA) system, a general packet radio service (GPRS) system, and other such communications systems.

In the following, an application architecture in this application is described, so as to help persons skilled in the art have a better understanding.

Figure 1:
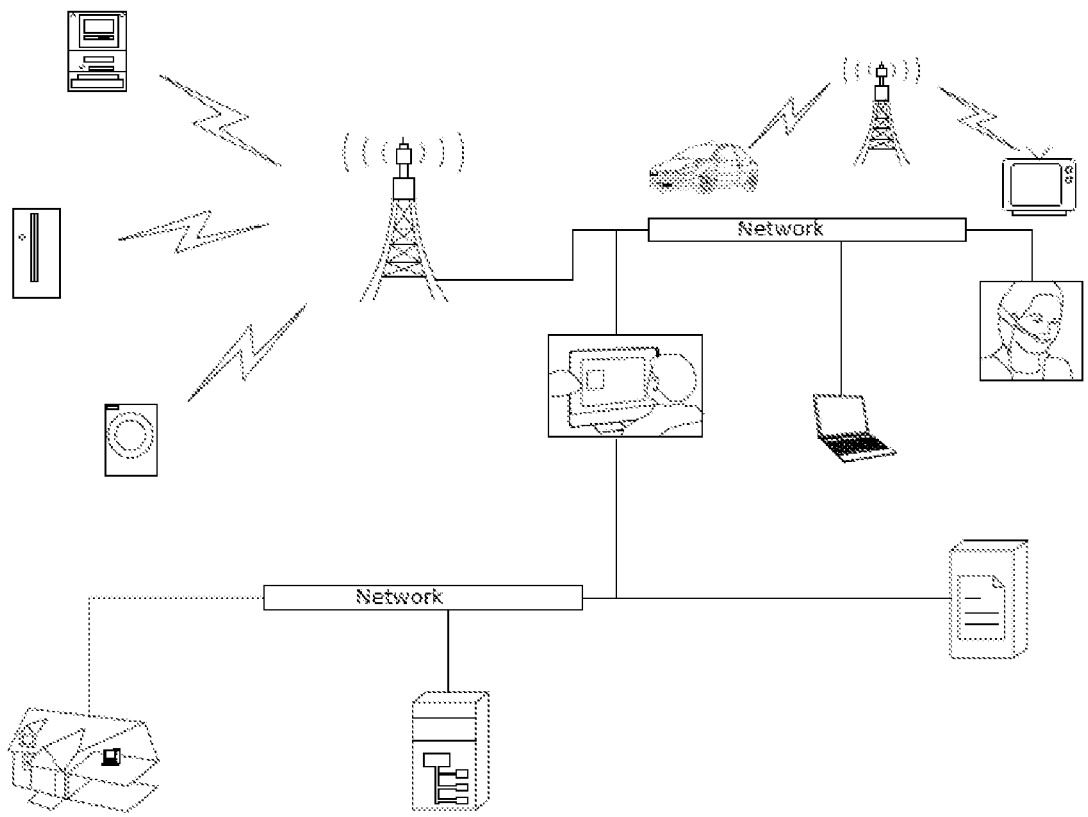
FIG. 1 is a schematic diagram of an M2M system in the prior art.
Figure 2A:
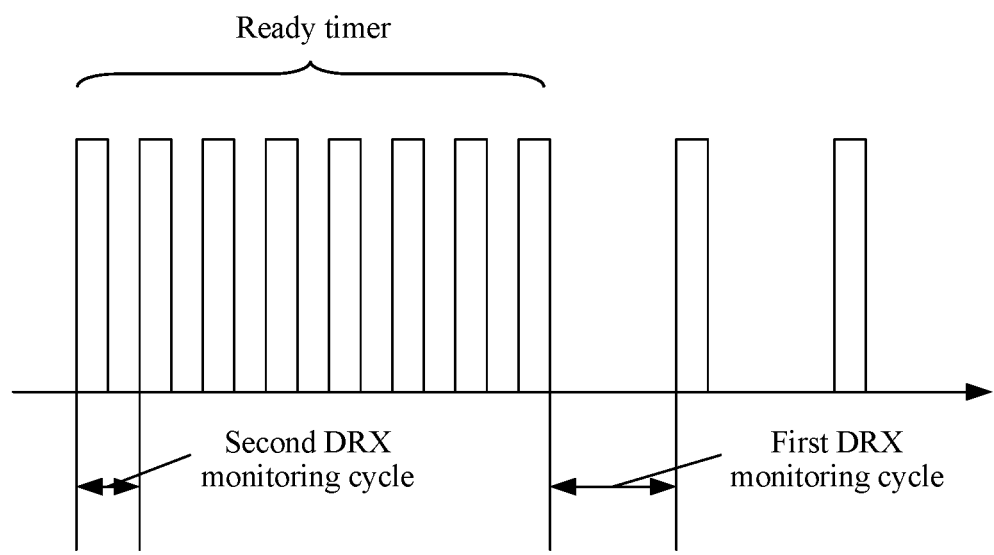
FIG. 2A is a schematic diagram of a Gb architecture in an embodiment of the present invention.
Figure 2B:
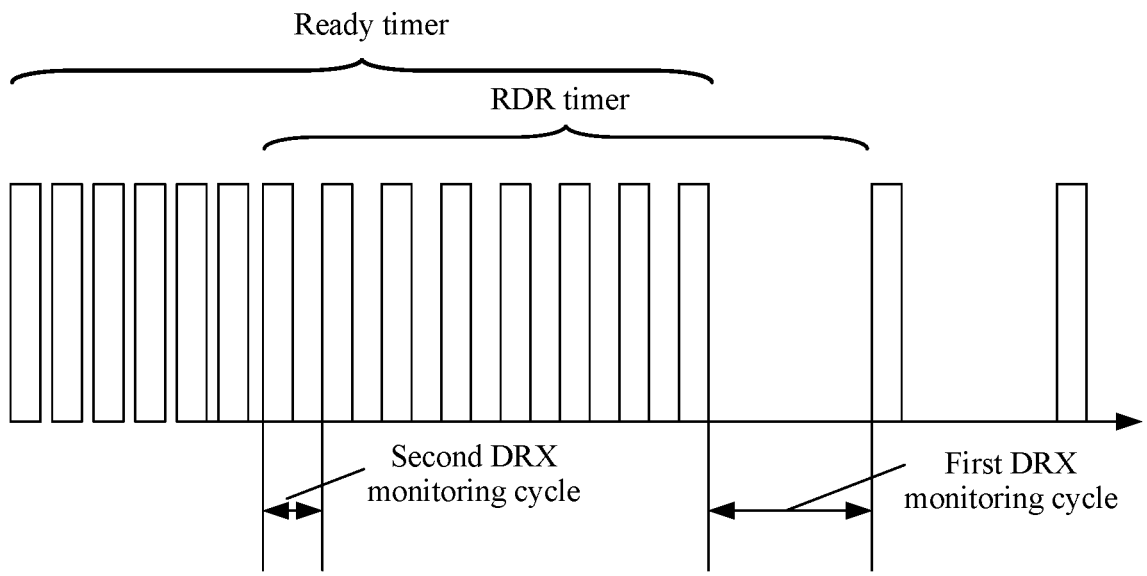
FIG. 2B is another schematic diagram of a Gb architecture in an embodiment of the present invention.
Figure 2C:
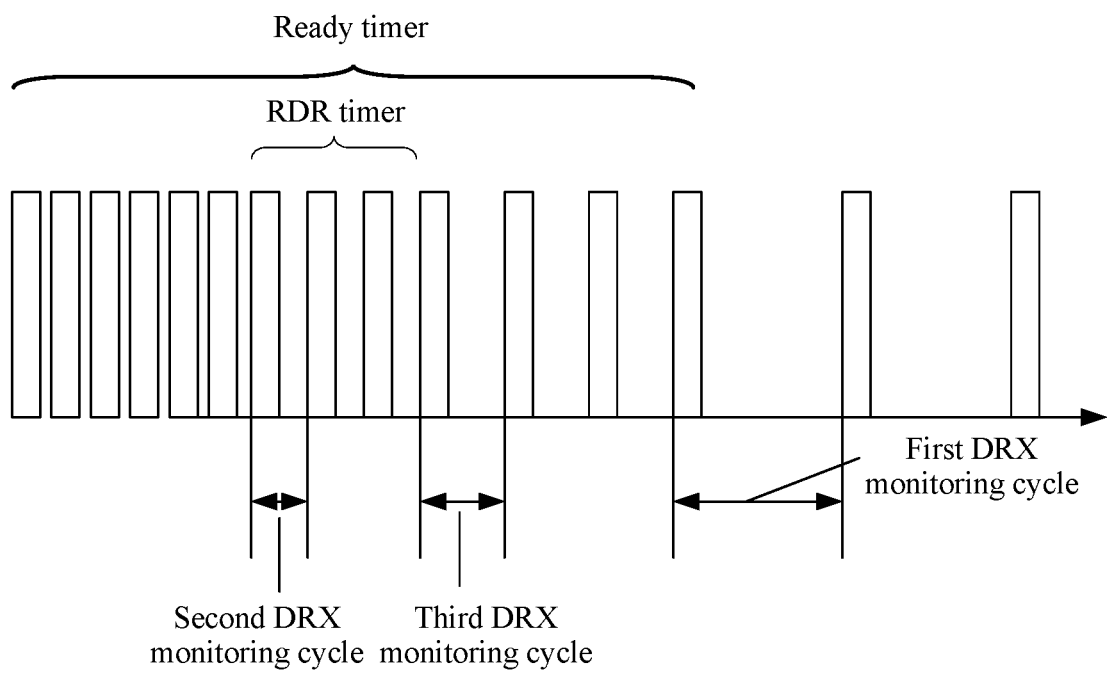
FIG. 2C is another schematic diagram of a Gb architecture in an embodiment of the present invention.

The present invention may be applied to a Gb architecture, and only a ready timer may be used in the Gb architecture. As shown in FIG. 2A, in a scenario in which only the ready timer is used, within a time period in which the ready timer does not expire, downlink scheduling data is monitored by using a second DRX (Discontinuous Reception, discontinuous reception) monitoring cycle, and within a time period after the ready timer expires, the downlink scheduling data is monitored by using a first DRX monitoring cycle. Further, an RDR timer may be used. As shown in FIG. 2B, within a time period in which neither the ready timer nor the RDR timer expires, the downlink scheduling data is monitored by using the second DRX monitoring cycle, and within a time period after the ready timer expires, the downlink scheduling data is monitored by using the first DRX monitoring cycle. In this case, when the ready timer expires, the RDR timer needs to stop even though the RDR timer does not expire. In FIG. 2B, a case in which the ready timer expires, but the RDR timer does not expire is described. Certainly, when the ready timer expires, the RDR timer may have expired. As shown in FIG. 2C, within a time period in which neither the ready timer nor the RDR timer expires, the downlink scheduling data is monitored by using the second DRX monitoring cycle; within a time period in which the ready timer does not expire, but the RDR timer expires, the downlink scheduling data is monitored by using a third DRX monitoring cycle; and within a time period after the ready timer expires, the downlink scheduling data is monitored by using the first DRX monitoring cycle.

The first DRX monitoring cycle is in a unit of minute or hour, and both the second DRX monitoring cycle and the third DRX monitoring cycle are in a unit of millisecond or second. The second DRX monitoring cycle may be the same as or different from the third DRX monitoring cycle.

Figure 2D:
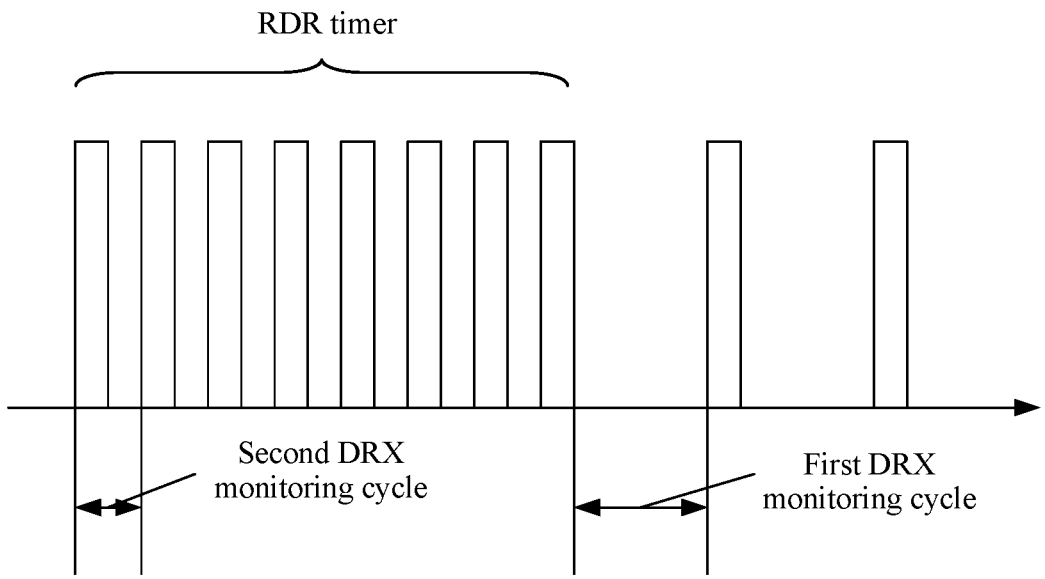
FIG. 2D is a schematic diagram of an S1 architecture in an embodiment of the present invention.

The present invention may be applied to an S1 architecture, and only an RDR timer may be used in the S1 architecture. As shown in FIG. 2D, in a scenario of the RDR timer, within a time period in which the RDR timer does not expire, downlink scheduling data is monitored by using a second DRX monitoring cycle, and within a time period after the RDR timer expires, the downlink scheduling data is monitored by using a first DRX monitoring cycle.

It should be noted that, a ready timer is a timer that is maintained by both a terminal and a core network. The core network herein may refer to an Serving GPRS Support Node (SGSN) GPRS. The terminal starts the ready timer after sending a last uplink LLC data packet, and the core network starts the ready timer after receiving the last uplink LLC data packet. An RDR timer is a timer that is set by both a terminal and a base station. On a terminal side, the terminal starts the RDR timer after sending a last uplink MAC layer data packet and receiving positive feedback information for the MAC layer data packet from the base station. After a ready timer on the terminal side expires, if the RDR timer does not expire, the terminal stops the RDR timer, and releases a connection on the terminal side. On a base station side, the base station starts the RDR timer after receiving the last uplink MAC layer data packet sent by the terminal and sending the positive feedback information for the MAC layer data packet to the terminal. In the Gb architecture, after a base station receives a paging message delivered by a core network, if an RDR timer does not expire, the RDR timer stops, and a connection to a terminal is released. If the timer expires, the base station releases a connection to the terminal. In the S1 architecture, after an RDR timer expires, a base station initiates a connection release request to a core network, and the core network releases an S1 connection to a terminal, and the base station releases an air interface connection to the terminal.

The following describes implementations of the present invention in detail with reference to the accompanying drawings. It should be understood that, the embodiments described herein are merely used to describe and explain the present invention, but are not intended to limit the present invention. In addition, the embodiments in this application and features in the embodiments may be mutually combined if they do not conflict with each other.

The following describes the embodiments of the present invention in detail with reference to the accompanying drawings.

Figure 3:
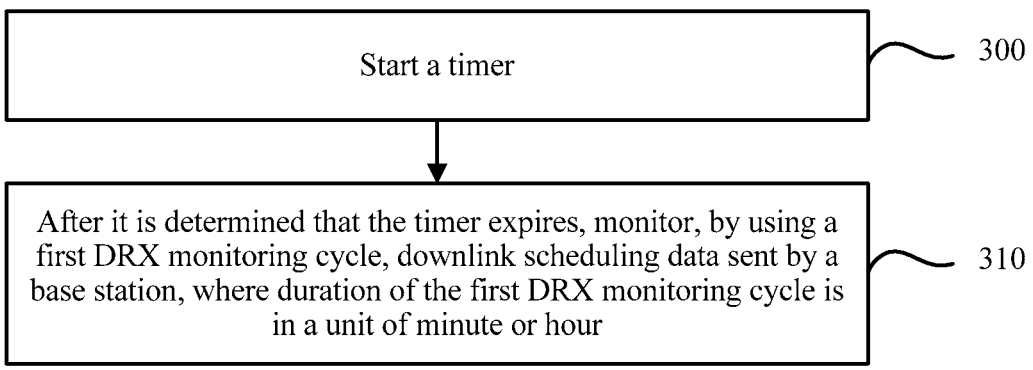
FIG. 3 is a flowchart of monitoring downlink scheduling data in an embodiment of the present invention.

Referring to FIG. 3, in an embodiment of the present invention, a procedure of monitoring downlink scheduling data is as follows:

Step 300: Start a timer.

Step 310: After it is determined that the timer expires, monitor, by using a first DRX monitoring cycle, downlink scheduling data sent by a base station.

Duration of the first DRX monitoring cycle is in a unit of minute or hour.

In the prior art, even though a timer expires, downlink scheduling data is monitored by using a DRX monitoring cycle whose duration is in a unit of second or millisecond, and consequently, power consumption is relatively large, and a relationship between power saving of a device and timely receiving of the downlink scheduling data cannot be balanced. However, in this embodiment of the present invention, after it is determined that the timer expires, the downlink scheduling data is monitored by using the first DRX monitoring cycle whose duration is in a unit of minute or hour, and in this way, not only power consumption is reduced, but also the downlink scheduling data can be monitored.

In this embodiment of the present invention, there are multiple manners of monitoring, by using the first DRX monitoring cycle, the downlink scheduling data sent by the base station. For example, the following several manners may be used:

monitoring, by using the first DRX monitoring cycle according to a scheduling identifier in an idle state or a scheduling identifier in a connected state, the downlink scheduling data sent by the base station.

In three scenarios shown in FIG. 2A, FIG. 2B, and FIG. 2C in a Gb architecture, after a ready timer expires, all terminals return to an idle state. In this case, the monitoring, by using a first DRX monitoring cycle, downlink scheduling data sent by a base station may include: monitoring, by using the first DRX monitoring cycle according to the scheduling identifier in an idle state, the downlink scheduling data sent by the base station.

In a scenario shown in FIG. 2D in an S1 architecture, after an RDR timer expires, a terminal may return to a long sleep state in an idle state, or may be still in a long sleep state in a connected state.

In the scenario shown in FIG. 2D, after the RDR timer expires, if the terminal returns to a long sleep state in an idle state, the monitoring, by using a first DRX monitoring cycle, downlink scheduling data sent by a base station may include: monitoring, by using the first DRX monitoring cycle according to the scheduling identifier in an idle state, the downlink scheduling data sent by the base station.

After the RDR timer expires, if the terminal returns to a long sleep state in a connected state, the monitoring, by using a first DRX monitoring cycle, downlink scheduling data sent by a base station may include: monitoring, by using the first DRX monitoring cycle according to the scheduling identifier in a connected state, the downlink scheduling data sent by the base station.

In this embodiment of the present invention, before the downlink scheduling data sent by the base station is monitored by using the first DRX monitoring cycle, the method further includes the following operation:

receiving a first DRX monitoring cycle that is sent by the base station in a broadcast manner or a dedicated signaling manner and that is supported by the base station, and using the first DRX monitoring cycle supported by the base station as the first DRX monitoring cycle; or receiving a first DRX monitoring cycle that is sent by the base station in a broadcast manner or a dedicated signaling manner and that is supported by the base station, and using a minimum DRX monitoring cycle or a maximum DRX monitoring cycle in the first DRX monitoring cycle supported by the base station and a first DRX monitoring cycle supported by a terminal as the first DRX monitoring cycle; or using a first DRX monitoring cycle reported by a terminal as the first DRX monitoring cycle.

Certainly, further, the terminal may send the supported first DRX monitoring cycle to a core network device.

In this embodiment of the present invention, the timer described in step 300 may include only a ready timer (Ready Timer). As shown in FIG. 2A, the ready timer is configured to determine that the terminal is switched from a ready state to a standby state. That is, before the ready timer expires, the terminal is in a ready state, and after the ready timer expires, the terminal is in a standby state.

If only the ready timer is included, the starting a timer may include:

starting the ready timer; and the determining that the timer expires may include:

determining that the ready timer expires.

Certainly, an RDR timer (Timer) may be further included. As shown in FIGS. 2B and 2C, the RDR timer is configured to determine that the terminal is switched from a connected state to a long sleep state. That is, when the RDR timer does not expire, the terminal is in a connected state, and after the RDR timer expires, the terminal is in a long sleep state. The long sleep state includes a long sleep state in an idle state or a long sleep state in a connected state.

In this case, the starting a timer may include:

starting the ready timer and the RDR timer, where a time of starting the ready timer is earlier than a time of starting the RDR timer.

Although both the ready timer and the RDR timer are included, the determining that the timer expires may include:

determining that the ready timer expires.

That is, although both the ready timer and the RDR timer are included, the downlink scheduling data sent by the base station may be monitored by using the first DRX monitoring cycle provided that the ready timer expires. In this case, if the ready timer expires, but the RDR timer does not expire, the RDR timer needs to stop, and a connection is released.

The foregoing describes a case in which the timer includes only a ready timer, or includes both a ready timer and an RDR timer. However, in actual application, the timer may include only an RDR timer. In this case, in the S1 architecture shown in FIG. 2D, the starting a timer may include:

starting the RDR timer; and the determining that the timer expires may include:

determining that the RDR timer expires.

When the timer includes only the RDR timer, and the terminal is in a long sleep state in a connected state after the RDR timer expires, before the downlink scheduling data sent by the base station is monitored by using the first DRX monitoring cycle, the method further includes the following operations:

determining an initial monitoring moment; and determining a DRX monitoring moment according to the initial monitoring moment, where the DRX monitoring moment is a moment at a distance of N first DRX monitoring cycles from the initial monitoring moment, and N is a positive integer greater than or equal to 0.

In this case, there are multiple manners of monitoring, by using the first DRX monitoring cycle, the downlink scheduling data sent by the base station. Optionally, the following manner may be used:

monitoring, at the DRX monitoring moment, the downlink scheduling data sent by the base station.

There are multiple manners of determining the initial monitoring moment. Optionally, the following manner may be used:

determining the initial monitoring moment according to an identifier of the terminal and the first DRX monitoring cycle; or using an end moment of the RDR timer as the initial monitoring moment.

The foregoing describes a case in which after the timer starts, it is determined that the timer expires. Certainly, a case in which after the timer starts, the timer does not expire exists. The following describes the case in which the timer does not expire.

Therefore, after the timer starts, the method further includes the following operation:

when it is determined that the timer does not expire, monitoring, by using a second DRX monitoring cycle, the downlink scheduling data sent by the base station.

Duration of the second DRX monitoring cycle is in a unit of millisecond or second.

That is, after the timer expires, the downlink scheduling data sent by the base station is monitored by using the first DRX monitoring cycle, and before the timer expires, the downlink scheduling data sent by the base station is monitored by using the second DRX monitoring cycle.

Before the downlink scheduling data sent by the base station is monitored by using the second DRX monitoring cycle, the method further includes the following operation:

receiving a second DRX monitoring cycle that is sent by the base station in a broadcast manner or a dedicated signaling manner and that is supported by the base station, and using the second DRX monitoring cycle supported by the base station as the second DRX monitoring cycle; or receiving a second DRX monitoring cycle that is sent by the base station in a broadcast manner or a dedicated signaling manner and that is supported by the base station, and using a minimum DRX monitoring cycle or a maximum DRX monitoring cycle in the second DRX monitoring cycle supported by the base station and a second DRX monitoring cycle supported by the terminal as the second DRX monitoring cycle; or using a second DRX monitoring cycle reported by the terminal as the second DRX monitoring cycle.

Certainly, when the timer does not expire, three cases exist. For example, the timer includes only a ready timer, or includes only an RDR timer, or includes both a ready timer and an RDR timer. The following separately gives description.

When the timer includes only the ready timer, the determining that the timer does not expire may include:

determining that the ready timer does not expire; and optionally, the monitoring, by using a second DRX monitoring cycle, the downlink scheduling data sent by the base station may include:

monitoring, by using the second DRX monitoring cycle according to a scheduling identifier in an idle state, the downlink scheduling data sent by the base station.

Alternatively, when the timer includes only the RDR timer, the determining that the timer does not expire may include:

determining that the RDR timer does not expire; and the monitoring, by using a second DRX monitoring cycle, the downlink scheduling data sent by the base station may include:

monitoring, by using the second DRX monitoring cycle according to a scheduling identifier in a connected state, the downlink scheduling data sent by the base station.

Alternatively, when the timer includes the ready timer and the RDR timer, the starting a timer may include:

starting the ready timer and the RDR timer, where a time of starting the ready timer is earlier than a time of starting the RDR timer; and the determining that the timer does not expire may include:

determining that the ready timer does not expire.

However, when it is determined that the ready timer does not expire, the RDR timer may expire, or may not expire. When the ready timer does not expire, and the RDR timer does not expire either, the monitoring, by using a second DRX monitoring cycle, the downlink scheduling data sent by the base station may include:

monitoring, by using the second DRX monitoring cycle according to a scheduling identifier in a connected state, the downlink scheduling data sent by the base station.

Certainly, when the ready timer does not expire, but the RDR timer expires, the downlink scheduling data sent by the base station needs to be monitored by using a third DRX monitoring cycle according to a scheduling identifier in an idle state.

Duration of the third DRX monitoring cycle is in a unit of millisecond or second.

It should be noted that, the second DRX monitoring cycle may be the same as or different from the third DRX monitoring cycle. This is not limited herein.

In this embodiment of the present invention, before the downlink scheduling data sent by the base station is monitored by using the third DRX monitoring cycle, the method further includes the following operation:

receiving a third DRX monitoring cycle that is sent by the base station in a broadcast manner or a dedicated signaling manner and that is supported by the base station, and using the third DRX monitoring cycle supported by the base station as the third DRX monitoring cycle; or receiving a third DRX monitoring cycle that is sent by the base station in a broadcast manner or a dedicated signaling manner and that is supported by the base station, and using a maximum DRX cycle or a minimum DRX cycle in the third DRX monitoring cycle supported by the base station and a third DRX monitoring cycle supported by the terminal as the third DRX monitoring cycle; or using a third DRX monitoring cycle reported by the terminal as the third DRX monitoring cycle.

In this embodiment of the present invention, there are multiple manners of starting the timer. Optionally, the following manner may be used:

starting the ready timer and/or the RDR timer, where the ready timer is configured to determine that the terminal is switched from a ready state to a standby state, and the RDR timer is configured to determine that the terminal is switched from a connected state to a long sleep state.

There are multiple manners of starting the ready timer. Optionally, the following manner may be used:

starting the ready timer when a last uplink logical link control (LLC) data packet is sent.

There are multiple manners of starting the RDR timer. Optionally, the following manner may be used:

starting the RDR timer when positive feedback information for a last uplink MAC layer data packet is received.

When monitoring the downlink scheduling data, for example, after obtaining a paging radio network temporary identifier (P-RNTI) by means of monitoring, the terminal reads a paging record on a paging resource indicated by the P-RNTI. If there is a paging record that includes the identifier of the terminal, it indicates that the terminal is paged. If there is no paging record that includes the identifier of the terminal, it indicates that the terminal is not paged.

In this embodiment of the present invention, the downlink scheduling data is downlink data, or may be a paging message, and certainly, may be in another form. This is not limited herein.

In this embodiment of the present invention, before the downlink scheduling data sent by the base station is monitored by using the first DRX monitoring cycle, the method further includes the following operations:

sending an access request to the base station;

receiving resource configuration information allocated by the base station according to the access request; and transmitting data between the base station and a core network according to the resource configuration information.

The scheduling identifier in a connected state is in many forms, and optionally, may be a TBF (Temporary Block Flow, temporary block flow), or may be a C-RNTI (Cell Radio Network Temporary Identifier, cell radio network temporary identifier).

The scheduling identifier in an idle state is also in many forms, and optionally, may be a UE-dedicated scheduling identifier in an idle state, for example, a temporary logical link identifier (TLLI), an SAE temporary mobile subscriber identity (S-TMSI), system architecture evolution (SAE)), a PS temporary mobile subscriber identity (P-TMSI), packet switched (PS)), an international mobile subscriber identity (IMSI), or an IMSI mod N, or may be a common scheduling identifier in an idle state, for example, a paging radio network temporary identifier (P-RNTI).

Figure 4:
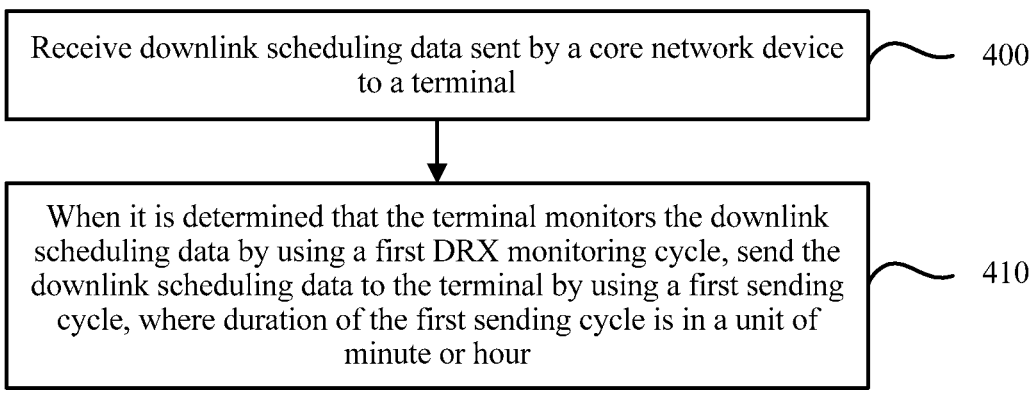
FIG. 4 is a flowchart of sending downlink scheduling data in an embodiment of the present invention.

Referring to FIG. 4, in an embodiment of the present invention, a procedure of sending downlink scheduling data is as follows:

Step 400: Receive downlink scheduling data sent by a core network device to a terminal.

Step 410: When it is determined that the terminal monitors the downlink scheduling data by using a first DRX monitoring cycle, send the downlink scheduling data to the terminal by using a first sending cycle.

Duration of the first sending cycle is in a unit of minute or hour.

In this embodiment of the present invention, there are multiple manners of determining that the terminal monitors the downlink scheduling data by using the first DRX monitoring cycle. Optionally, the following manner may be used:

determining, according to the first DRX monitoring cycle carried in the downlink scheduling data, that the terminal monitors the downlink scheduling data by using the first DRX monitoring cycle; or when it is determined that the downlink scheduling data is a paging message, determining that the terminal monitors the downlink scheduling data by using the first DRX monitoring cycle.

That is, if the downlink scheduling data directly carries the first DRX monitoring cycle, it may be directly determined, according to the first DRX monitoring cycle, that the terminal monitors the downlink scheduling data by using the first DRX monitoring cycle. If the downlink scheduling data does not carry the first DRX monitoring cycle, a type of the downlink scheduling data may be determined. If the type of the downlink scheduling data is a paging message, it is determined that the terminal monitors the downlink scheduling data by using the first DRX monitoring cycle.

The foregoing two cases are applied to scenarios shown in FIG. 2A, FIG. 2B, and FIG. 2C in a Gb architecture, and is also applied to a scenario in which after an RDR timer expires, a terminal is in an idle state and that is shown in FIG. 2D.

Certainly, when an RDR timer expires, it may be determined that the terminal monitors the downlink scheduling data by using the first DRX monitoring cycle.

After an RDR timer in an S1 architecture expires, when the terminal is in a long sleep state in a connected state, it may be determined, by adding the first DRX monitoring cycle to the downlink scheduling data, that the terminal monitors the downlink scheduling data by using the first DRX monitoring cycle; or it may be determined, by determining that the RDR timer expires, that the terminal monitors the downlink scheduling data by using the first DRX monitoring cycle.

Therefore, in this embodiment of the present invention, before the downlink scheduling data is sent to the terminal by using the first sending cycle, the method further includes the following operations:

receiving a last uplink MAC layer data packet sent by the terminal; and sending positive feedback information for the last uplink MAC layer data packet to the terminal, and starting an RDR timer, where the RDR timer is configured to determine that the terminal is switched from a connected state to a long sleep state.

The following manner may be used to determine that the terminal monitors the downlink scheduling data by using the first discontinuous reception DRX monitoring cycle:

when it is determined that the RDR timer expires, determining that the terminal monitors the downlink scheduling data by using the first DRX monitoring cycle.

In this embodiment of the present invention, before the downlink scheduling data is sent to the terminal by using the first sending cycle, the method further includes the following operations:

sending the first DRX monitoring cycle to the terminal in a broadcast manner or a dedicated signaling manner; or sending, in a broadcast manner or a dedicated signaling manner, a first DRX monitoring cycle supported by a base station to the terminal; and/or sending, in a form of uplink data at a logical link control layer, the first DRX monitoring cycle supported by the base station to the core network device.

In this embodiment of the present invention, before the downlink scheduling data is sent to the terminal by using the first sending cycle, the method further includes:

determining an initial sending moment;

determining a DRX sending moment according to the initial sending moment, where the DRX sending moment is a moment at a distance of N first sending cycles from the initial sending moment, and N is a positive integer greater than or equal to 0; and sending the downlink scheduling data at the DRX sending moment.

In this embodiment of the present invention, there are multiple manners of determining the initial sending moment. Optionally, the following manner may be used:

determining the initial sending moment according to an identifier of the terminal and the first sending cycle; or using an end moment of the RDR timer as the initial sending moment, where the RDR timer is configured to determine that the terminal is switched from a connected state to an idle state.

The foregoing manner of determining the DRX sending moment is applied to a case in which when an RDR timer expires in the S1 architecture, the terminal is still in a long sleep state in a connected state.

In the foregoing description, it is determined that the terminal monitors the downlink scheduling data by using the first DRX monitoring cycle. Certainly, the terminal may monitor the downlink scheduling data by using a second DRX monitoring cycle. In this case, the base station needs to send the downlink scheduling data by using a second sending cycle corresponding to the second DRX monitoring cycle. Therefore, in this embodiment of the present invention, before it is determined that the terminal monitors the downlink scheduling data by using the first discontinuous reception DRX monitoring cycle, the method further includes the following operation:

determining that the terminal monitors the downlink scheduling data by using a second DRX monitoring cycle, and sending the downlink scheduling data to the terminal by using a second sending cycle.

Duration of the second sending cycle is in a unit of millisecond or second.

In this embodiment of the present invention, there are multiple manners of determining that the terminal monitors the downlink scheduling data by using the second DRX monitoring cycle. Optionally, the following manner may be used:

determining, according to the second DRX monitoring cycle carried in the downlink scheduling data, that the terminal monitors the downlink scheduling data by using the second DRX monitoring cycle; or when it is determined that the downlink scheduling data is downlink data, determining that the terminal monitors the downlink scheduling data by using the second DRX monitoring cycle.

Certainly, for scenarios shown in FIG. 2B and FIG. 2C, when the downlink scheduling data is downlink data, the terminal may not monitor the downlink scheduling data by using the second DRX monitoring cycle. Further, when an RDR timer starts and does not expire, it is determined that the terminal monitors the downlink scheduling data by using the second DRX monitoring cycle. Therefore, in this embodiment of the present invention, before the downlink scheduling data is sent to the terminal by using the second sending cycle, the method further includes the following operations:

receiving a last uplink MAC layer data packet sent by the terminal; and sending positive feedback information for the last uplink MAC layer data packet to the terminal, and starting an RDR timer, where the RDR timer is configured to determine that the terminal is switched from a connected state to a long sleep state; and the determining that the terminal monitors the downlink scheduling data by using a second DRX monitoring cycle includes:

when it is determined that the downlink scheduling data is downlink data, and the RDR timer does not expire, determining that the terminal monitors the downlink scheduling data by using the second DRX monitoring cycle.

In this embodiment of the present invention, before the downlink scheduling data is sent to the terminal by using the second sending cycle, the method further includes the following operations:

sending the second DRX monitoring cycle to the terminal in a broadcast manner or a dedicated signaling manner; or sending, in a broadcast manner or a dedicated signaling manner, a second DRX monitoring cycle supported by the base station to the terminal; and/or sending, in a form of uplink data at a logical link control layer, the second DRX monitoring cycle supported by the base station to the core network device.

In FIG. 2C, within a time period in which a ready timer does not expire, but an RDR timer expires, the terminal monitors the downlink scheduling data by using a third DRX monitoring cycle. Therefore, in this embodiment of the present invention, before the downlink scheduling data is sent to the terminal by using the first sending cycle, the method further includes the following operation:

when it is determined that the terminal monitors the downlink scheduling data by using a third DRX monitoring cycle, sending the downlink scheduling data to the terminal by using a third sending cycle.

Duration of the third sending cycle is from a millisecond range to a second range.

In this embodiment of the present invention, before it is determined that the terminal monitors the downlink scheduling data by using the third DRX monitoring cycle, the method further includes the following operations:

receiving a last uplink MAC layer data packet sent by the terminal; and sending positive feedback information for the last uplink MAC layer data packet to the terminal, and starting an RDR timer, where the RDR timer is configured to determine that the terminal is switched from a connected state to a long sleep state; and the determining that the terminal monitors the downlink scheduling data by using a third DRX monitoring cycle includes:

when it is determined that the downlink scheduling data is downlink data, and the RDR timer expires, determining that the terminal monitors the downlink scheduling data by using the third DRX monitoring cycle.

In this embodiment of the present invention, before it is determined that the terminal monitors the downlink scheduling data by using the third DRX monitoring cycle, the method further includes the following operations:

sending the third DRX monitoring cycle to the terminal in a broadcast manner or a dedicated signaling manner; and/or sending the third DRX monitoring cycle to the core network device in a form of uplink data at a logical link control layer.

It should be noted that, the third sending cycle may be the same as or different from the second sending cycle. This is not limited herein.

In this embodiment of the present invention, the first DRX monitoring cycle, the second DRX monitoring cycle, and the third DRX monitoring cycle that are sent by the base station to the terminal may be determined by the base station, or may be sent by a core network. Certainly, another manner may be used, and this is not limited herein.

Figure 5A:
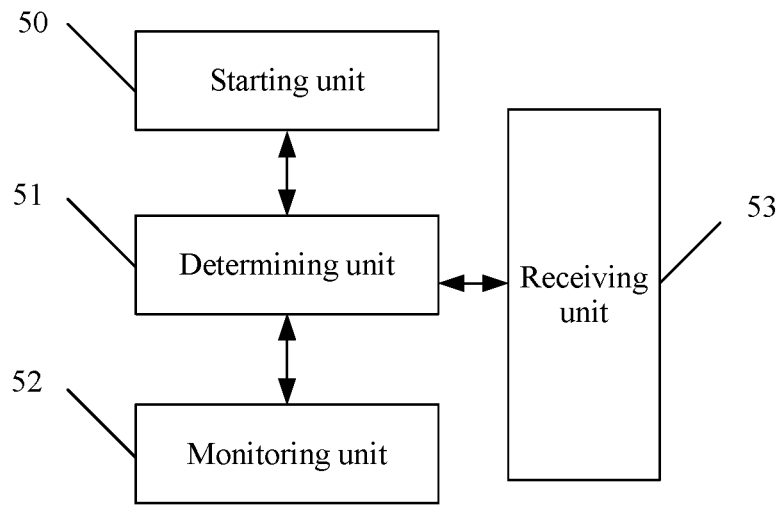
FIG. 5A is a schematic structural diagram of a terminal in an embodiment of the present invention.

Referring to FIG. 5A, a schematic diagram of a terminal is provided in an embodiment of the present invention. The terminal includes a starting unit 50, a determining unit 51, and a monitoring unit 52.

The starting unit 50 is configured to start a timer.

The determining unit 51 is configured to determine that the timer expires.

The monitoring unit 52 is configured to: after the determining unit 51 determines that the timer expires, monitor, by using a first discontinuous reception DRX monitoring cycle, downlink scheduling data sent by a base station.

Duration of the first DRX monitoring cycle is in a unit of minute or hour.

Optionally, the monitoring unit 52 is configured to:
monitor, by using the first DRX monitoring cycle according to a scheduling identifier in an idle state or a scheduling identifier in a connected state, the downlink scheduling data sent by the base station.

The terminal further includes a receiving unit 53. The receiving unit 53 is configured to receive a first DRX monitoring cycle that is sent by the base station in a broadcast manner or a dedicated signaling manner and that is supported by the base station, and the determining unit 51 is further configured to use the first DRX monitoring cycle supported by the base station as the first DRX monitoring cycle; or the receiving unit 53 is configured to receive a first DRX monitoring cycle that is sent by the base station in a broadcast manner or a dedicated signaling manner and that is supported by the base station, and the determining unit 51 is further configured to use a minimum DRX monitoring cycle or a maximum DRX monitoring cycle in the first DRX monitoring cycle supported by the base station and a first DRX monitoring cycle supported by the terminal as the first DRX monitoring cycle; or the determining unit 51 is further configured to use a first DRX monitoring cycle reported by the terminal as the first DRX monitoring cycle.

Optionally, the timer includes a ready timer (Ready Timer), and the ready timer is configured to determine that the terminal is switched from a ready state to a standby state.

The timer further includes a reduced downlink control signal reception RDR timer, and the RDR timer is configured to determine that the terminal is switched from a connected state to a long sleep state.

The starting unit 50 is configured to start the ready timer and the RDR timer, where a time of starting the ready timer is earlier than a time of starting the RDR timer.

The determining unit 51 is configured to determine that the ready timer expires.

Optionally, the timer includes an RDR timer, and the RDR timer is configured to determine that the terminal is switched from a connected state to a long sleep state.

The determining unit 51 is further configured to: determine an initial monitoring moment; and determine a DRX monitoring moment according to the initial monitoring moment, where the DRX monitoring moment is a moment at a distance of N first DRX monitoring cycles from the initial monitoring moment, and N is a positive integer greater than or equal to 0.

The monitoring unit 52 is configured to monitor, at the DRX monitoring moment, the downlink scheduling data sent by the base station.

Optionally, that the determining unit 51 determines an initial monitoring moment is:

determining the initial monitoring moment according to an identifier of the terminal and the first DRX monitoring cycle; or using an end moment of the RDR timer as the initial monitoring moment.

The determining unit 51 is further configured to determine that the timer does not expire.

The monitoring unit 52 is further configured to: when the determining unit 51 determines that the timer does not expire, monitor, by using a second DRX monitoring cycle, the downlink scheduling data sent by the base station.

Duration of the second DRX monitoring cycle is in a unit of millisecond or second.

The terminal further includes a receiving unit 53. The receiving unit 53 is configured to receive a second DRX monitoring cycle that is sent by the base station in a broadcast manner or a dedicated signaling manner and that is supported by the base station, and the determining unit 51 is further configured to use the second DRX monitoring cycle supported by the base station as the second DRX monitoring cycle; or the receiving unit 53 is further configured to receive a second DRX monitoring cycle that is sent by the base station in a broadcast manner or a dedicated signaling manner and that is supported by the base station, and the determining unit 51 is further configured to use a minimum DRX monitoring cycle or a maximum DRX monitoring cycle in the second DRX monitoring cycle supported by the base station and a second DRX monitoring cycle supported by the terminal as the second DRX monitoring cycle; or the determining unit 51 is further configured to use a second DRX monitoring cycle reported by the terminal as the second DRX monitoring cycle.

Optionally, the timer includes a ready timer, and the ready timer is configured to determine that the terminal is switched from a ready state to a standby state.

The monitoring unit 52 is configured to monitor, by using the second DRX monitoring cycle according to a scheduling identifier in an idle state, the downlink scheduling data sent by the base station.

Optionally, the timer includes an RDR timer, and the RDR timer is configured to determine that the terminal is switched from a connected state to a long sleep state.

The monitoring unit 52 is configured to monitor, by using the second DRX monitoring cycle according to a scheduling identifier in a connected state, the downlink scheduling data sent by the base station.

Optionally, the timer includes a ready timer and an RDR timer, the ready timer is configured to determine that the terminal is switched from a ready state to a standby state, and the RDR timer is configured to determine that the terminal is switched from a connected state to a long sleep state.

The starting unit 50 is configured to start the ready timer and the RDR timer, where a time of starting the ready timer is earlier than a time of starting the RDR timer.

That the determining unit 51 determines that the timer does not expire is:

determining that the ready timer does not expire.

The determining unit 51 is further configured to determine that the RDR timer does not expire.

The monitoring unit 52 is configured to monitor, by using the second DRX monitoring cycle according to a scheduling identifier in a connected state, the downlink scheduling data sent by the base station.

The determining unit 51 is further configured to determine that the RDR timer expires.

The monitoring unit 52 is further configured to monitor, by using a third DRX monitoring cycle according to a scheduling identifier in an idle state, the downlink scheduling data sent by the base station.

Duration of the third DRX monitoring cycle is in a unit of millisecond or second.

The terminal further includes a receiving unit 53. The receiving unit 53 is configured to receive a third DRX monitoring cycle that is sent by the base station in a broadcast manner or a dedicated signaling manner and that is supported by the base station, and the determining unit 51 is further configured to use the third DRX monitoring cycle supported by the base station as the third DRX monitoring cycle; or the receiving unit 53 is further configured to receive a third DRX monitoring cycle that is sent by the base station in a broadcast manner or a dedicated signaling manner and that is supported by the base station, and the determining unit 51 is further configured to use a maximum DRX cycle or a minimum DRX cycle in the third DRX monitoring cycle supported by the base station and a third DRX monitoring cycle supported by the terminal as the third DRX monitoring cycle; or the determining unit 51 is further configured to use a third DRX monitoring cycle reported by the terminal as the third DRX monitoring cycle.

Optionally, the starting unit 50 is configured to start the ready timer and/or the RDR timer, the ready timer is configured to determine that the terminal is switched from a ready state to a standby state, and the RDR timer is configured to determine that the terminal is switched from a connected state to a long sleep state.

Optionally, that the starting unit 50 starts the ready timer is:

starting the ready timer when a last uplink logical link control LLC data packet is sent; and that the starting unit 50 starts the RDR timer is:

starting the RDR timer when positive feedback information for a last uplink MAC layer data packet is received.

Figure 5B:
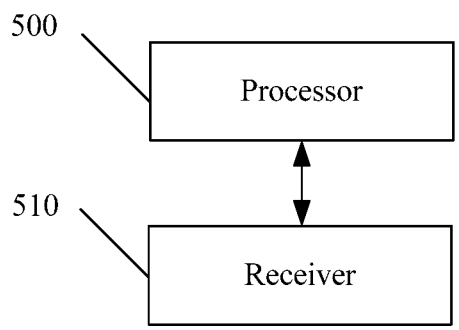
FIG. 5B is another schematic structural diagram of a terminal in an embodiment of the present invention.

Referring to FIG. 5B, a schematic diagram of a terminal is provided in an embodiment of the present invention. The terminal includes a processor 500 and a receiver 510.

The processor 500 is configured to start a timer.

The processor 500 is further configured to determine that the timer expires.

The receiver 510 is configured to: after the processor 500 determines that the timer expires, monitor, by using a first discontinuous reception DRX monitoring cycle, downlink scheduling data sent by a base station.

Duration of the first DRX monitoring cycle is in a unit of minute or hour.

It should be noted that, the processor 500 may further perform other operations performed by the starting unit 50 and the determining unit 51 that are shown in FIG. 5A, and the receiver 510 may further perform other operations performed by the monitoring unit 52 and the receiving unit 53 that are shown in FIG. 5A.

Figure 6A:
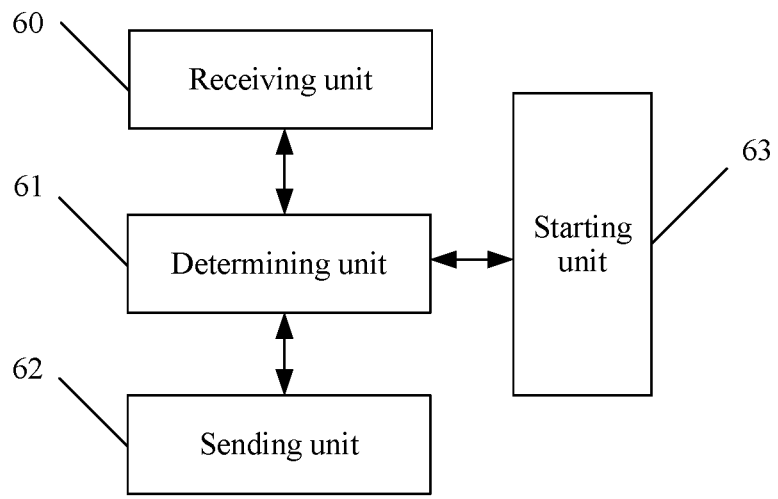
FIG. 6A is a schematic structural diagram of a base station in an embodiment of the present invention.

Referring to FIG. 6A, a schematic diagram of a base station is provided in an embodiment of the present invention. The base station includes a receiving unit 60, a determining unit 61, and a sending unit 62.

The receiving unit 60 is configured to receive downlink scheduling data sent by a core network device to a terminal.

The determining unit 61 is configured to determine that the terminal monitors the downlink scheduling data by using a first discontinuous reception DRX monitoring cycle.

The sending unit 62 is configured to: when the determining unit 61 determines that the terminal monitors the downlink scheduling data by using the first discontinuous reception DRX monitoring cycle, send the downlink scheduling data to the terminal by using a first sending cycle.

Duration of the first sending cycle is in a unit of minute or hour.

Optionally, the determining unit 61 is configured to: determine, according to the first DRX monitoring cycle carried in the downlink scheduling data, that the terminal monitors the downlink scheduling data by using the first DRX monitoring cycle; or when determining that the downlink scheduling data is a paging message, determine that the terminal monitors the downlink scheduling data by using the first DRX monitoring cycle.

The receiving unit 60 is further configured to receive a last uplink MAC layer data packet sent by the terminal.

The sending unit 62 is further configured to send positive feedback information for the last uplink MAC layer data packet to the terminal.

The base station further includes a starting unit 63, configured to start a reduced downlink control signal reception RDR timer when the sending unit 62 sends the positive feedback information for the last uplink MAC layer data packet to the terminal, where the RDR timer is configured to determine that the terminal is switched from a connected state to a long sleep state.

The determining unit 61 is configured to: when determining that the RDR timer expires, determine that the terminal monitors the downlink scheduling data by using the first DRX monitoring cycle.

The sending unit 62 is further configured to: send the first DRX monitoring cycle to the terminal in a broadcast manner or a dedicated signaling manner; or send, in a broadcast manner or a dedicated signaling manner, a first DRX monitoring cycle supported by the base station to the terminal; and/or send, in a form of uplink data at a logical link control layer, the first DRX monitoring cycle supported by the base station to the core network device.

The determining unit 61 is further configured to: determine an initial sending moment; and determine a DRX sending moment according to the initial sending moment, where the DRX sending moment is a moment at a distance of N first sending cycles from the initial sending moment, and N is a positive integer greater than or equal to 0.

The sending unit 62 is configured to send the downlink scheduling data at the DRX sending moment.

Optionally, that the determining unit 61 determines an initial sending moment is:

determining the initial sending moment according to an identifier of the terminal and the first sending cycle; or using an end moment of the RDR timer as the initial sending moment, where the RDR timer is configured to determine that the terminal is switched from a connected state to a long sleep state.

The determining unit 61 is further configured to determine that the terminal monitors the downlink scheduling data by using a second DRX monitoring cycle.

The sending unit 62 is further configured to send the downlink scheduling data to the terminal by using a second sending cycle.

Duration of the second sending cycle is in a unit of millisecond or second.

Optionally, that the determining unit 61 determines that the terminal monitors the downlink scheduling data by using a second DRX monitoring cycle is:

determining, according to the second DRX monitoring cycle carried in the downlink scheduling data, that the terminal monitors the downlink scheduling data by using the second DRX monitoring cycle; or when determining that the downlink scheduling data is downlink data, determining that the terminal monitors the downlink scheduling data by using the second DRX monitoring cycle.

The receiving unit 60 is further configured to receive a last uplink MAC layer data packet sent by the terminal.

The sending unit 62 is further configured to send positive feedback information for the last uplink MAC layer data packet to the terminal.

The base station further includes a starting unit 63, configured to start an RDR timer when the sending unit 62 sends the positive feedback information for the last uplink MAC layer data packet to the terminal, where the RDR timer is configured to determine that the terminal is switched from a connected state to a long sleep state.

That the determining unit 61 determines that the terminal monitors the downlink scheduling data by using a second DRX monitoring cycle is:

when determining that the downlink scheduling data is downlink data, and the RDR timer does not expire, determining that the terminal monitors the downlink scheduling data by using the second DRX monitoring cycle.

The sending unit 62 is further configured to: send the second DRX monitoring cycle to the terminal in a broadcast manner or a dedicated signaling manner; or send, in a broadcast manner or a dedicated signaling manner, a second DRX monitoring cycle supported by the base station to the terminal; and/or send, in a form of uplink data at a logical link control layer, the second DRX monitoring cycle supported by the base station to the core network device.

The determining unit 61 is further configured to determine that the terminal monitors the downlink scheduling data by using a third DRX monitoring cycle.

The sending unit 62 is further configured to: when the determining unit 61 determines that the terminal monitors the downlink scheduling data by using the third DRX monitoring cycle, send the downlink scheduling data to the terminal by using a third sending cycle.

Duration of the third sending cycle is from a millisecond range to a second range.

The receiving unit 60 is further configured to receive a last uplink MAC layer data packet sent by the terminal.

The sending unit 62 is further configured to send positive feedback information for the last uplink MAC layer data packet to the terminal.

The base station further includes a starting unit 63, configured to start an RDR timer when the sending unit 62 sends the positive feedback information for the last uplink MAC layer data packet to the terminal, where the RDR timer is configured to determine that the terminal is switched from a connected state to a long sleep state.

That the determining unit 61 determines that the terminal monitors the downlink scheduling data by using a third DRX monitoring cycle is:

when determining that the downlink scheduling data is downlink data, and the RDR timer expires, determining that the terminal monitors the downlink scheduling data by using the third DRX monitoring cycle.

The sending unit 62 is further configured to: send the third DRX monitoring cycle to the terminal in a broadcast manner or a dedicated signaling manner; and/or send the third DRX monitoring cycle to the core network device in a form of uplink data at a logical link control layer.

Figure 6B:
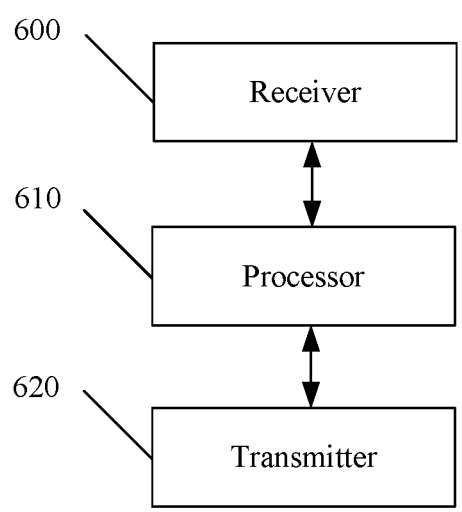
FIG. 6B is another schematic structural diagram of a base station in an embodiment of the present invention.

Referring to FIG. 6B, a schematic diagram of a base station is provided in an embodiment of the present invention. The base station includes a receiver 600, a processor 610, and a transmitter 620.

The receiver 600 is configured to receive downlink scheduling data sent by a core network device to the terminal.

The processor 610 is configured to determine that the terminal monitors the downlink scheduling data by using a first discontinuous reception DRX monitoring cycle.

The transmitter 620 is configured to: when the processor 610 determines that the terminal monitors the downlink scheduling data by using the first discontinuous reception DRX monitoring cycle, send the downlink scheduling data to the terminal by using a first sending cycle.

Duration of the first sending cycle is in a unit of minute or hour.

It should be noted that, the receiver 600 may further perform other operations performed by the receiving unit 60 shown in FIG. 6A, the processor 610 may further perform other operations performed by the determining unit 61 and the starting unit 63 that are shown in FIG. 6A, and the transmitter 620 may further perform other operations performed by the sending unit 62 shown in FIG. 6A.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention.

Apparently, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

The invention claimed is:

1. A downlink scheduling data sending method, comprising:
receiving, by a base station, downlink scheduling data sent from a core network device to a terminal;
determining, by the base station, that the terminal monitors the downlink scheduling data according to a first discontinuous reception (DRX) monitoring cycle when in an idle state and that the terminal monitors the downlink scheduling according to a second DRX monitoring cycle when in a connected state; and
sending, by the base station, the downlink scheduling data to the terminal using a first sending cycle when the terminal is determined to monitor the downlink scheduling data according to the first DRX monitoring cycle,
sending, by the base station, the downlink scheduling data to the terminal using a second sending cycle when the terminal is determined to monitor the downlink scheduling data according to the second DRX monitoring cycle,
wherein the first DRX monitoring cycle is longer than the second DRX monitoring cycle and the first sending cycle is longer than the second sending cycle.

2. The method according to claim 1, wherein determining, by the base station, the terminal monitors the downlink scheduling data by using a first DRX monitoring cycle comprises:
determining, according to the first DRX monitoring cycle carried in the downlink scheduling data, that the terminal monitors the downlink scheduling data using the first DRX monitoring cycle; or
when it is determined that the downlink scheduling data is a paging message, determining that the terminal monitors the downlink scheduling data by using the first DRX monitoring cycle.

3. The method according to claim 1, wherein before sending, by the base station, the downlink scheduling data to the terminal using a first sending cycle, the method further comprises:
sending, by the base station, the first DRX monitoring cycle to the terminal in a broadcast manner or a dedicated signaling manner; or sending, by the base station, in a broadcast manner or a dedicated signaling manner, a first DRX monitoring cycle supported by a base station to the terminal; and/or
sending, by the base station, in a form of uplink data at a logical link control layer, the first DRX monitoring cycle supported by the base station to the core network device.

4. The method according to claim 1, wherein before determining, by the base station, that the terminal monitors the downlink scheduling data according to the first DRX monitoring cycle, the method further comprises:
determining, by the base station, that the terminal monitors the downlink scheduling data using a second DRX monitoring cycle, and sending the downlink scheduling data to the terminal by using a second sending cycle, wherein a unit of a duration of the second sending cycle is millisecond or second.

5. The method according to claim 4, wherein determining, by the base station, that the terminal monitors the downlink scheduling data using a second DRX monitoring cycle comprises:
determining, according to the second DRX monitoring cycle carried in the downlink scheduling data, that the terminal monitors the downlink scheduling data using the second DRX monitoring cycle; or
when it is determined that the downlink scheduling data is downlink data, determining that the terminal monitors the downlink scheduling data by using the second DRX monitoring cycle.

6. The method according to claim 4, wherein before sending, by the base station, the downlink scheduling data to the terminal using the second sending cycle, the method further comprises:
sending, by the base station, the second DRX monitoring cycle to the terminal in a broadcast manner or a dedicated signaling manner; and/or
sending, in a form of uplink data at a logical link control layer, the second DRX monitoring cycle supported by the base station to the core network device.

7. The downlink scheduling data sending method of claim 1, wherein a duration of the first sending cycle is in a unit of minute or hour and a duration of the second sending cycle is in a unite of millisecond or second.

8. The downlink scheduling data sending method of claim 1, wherein the method further comprises:
determine an initial sending moment; and determine a DRX sending moment according to the initial sending moment, wherein the DRX sending moment is a moment at a distance of N first sending cycles from the initial sending moment, and N is a positive integer greater than or equal to 0; and send the downlink scheduling data at the DRX sending moment.

9. A base station, comprising:
a processor; and a computer-readable storage medium storing a program to be executed by the processor; a receiver; and a transmitter; wherein,
the receiver is configured to receive downlink scheduling data sent from a core network device to a terminal;
the processor is configured to determine that the terminal monitors the downlink scheduling data using a first discontinuous reception (DRX) monitoring cycle; and
the transmitter is configured to: when the processor determines that the terminal monitors the downlink scheduling data using the first discontinuous reception DRX monitoring cycle, send the downlink scheduling data to the terminal using a first sending cycle, when the processor determines that the terminal monitors the downlink scheduling data using the second DRX monitoring cycle, send the downlink scheduling data to the terminal using a second sending cycle, wherein the first DRX monitoring cycle is longer than the second DRX monitoring cycle and the first sending cycle is longer than the second sending cycle.

10. The base station according to claim 9, wherein the processor is configured to:
determine, according to the first DRX monitoring cycle carried in the downlink scheduling data, that the terminal monitors the downlink scheduling data by using the first DRX monitoring cycle; or
when determining that the downlink scheduling data is a paging message, determine that the terminal monitors the downlink scheduling data by using the first DRX monitoring cycle.

11. The base station according to claim 9, wherein the transmitter is configured to: send the first DRX monitoring cycle to the terminal in a broadcast manner or a dedicated signaling manner; and/or
send, in a form of uplink data at a logical link control layer, the first DRX monitoring cycle supported by the base station to the core network device.

12. The base station according to claim 9, wherein the processor is further configured to: determine an initial sending moment; and determine a DRX sending moment according to the initial sending moment, wherein the DRX sending moment is a moment at a distance of N first sending cycles from the initial sending moment, and N is a positive integer greater than 0; and
the transmitter is configured to send the downlink scheduling data at the DRX sending moment.

13. The base station according to claim 9, wherein the processor is further configured to determine that the terminal monitors the downlink scheduling data by using a second DRX monitoring cycle; and
the transmitter is configured to send the downlink scheduling data to the terminal by using a second sending cycle, wherein a unit of a duration of the second sending cycle is millisecond or second.

14. The base station according to claim 13, wherein determining by the processor that the terminal monitors the downlink scheduling data by using a second DRX monitoring cycle comprises:
determining, according to the second DRX monitoring cycle carried in the downlink scheduling data, that the terminal monitors the downlink scheduling data by using the second DRX monitoring cycle; or
when determining that the downlink scheduling data is downlink data, determining that the terminal monitors the downlink scheduling data by using the second DRX monitoring cycle.

15. The base station according to claim 13, wherein the transmitter is configured to: send the second DRX monitoring cycle to the terminal in a broadcast manner or a dedicated signaling manner; and/or
send, in a form of uplink data at a logical link control layer, the second DRX monitoring cycle supported by the base station to the core network device.

16. The base station according to claim 13, wherein the processor is further configured to determine that the terminal monitors the downlink scheduling data by using a third DRX monitoring cycle; and
the transmitter is configured to: when the processor determines that the terminal monitors the downlink scheduling data by using the third DRX monitoring cycle, send the downlink scheduling data to the terminal by using a third sending cycle, wherein
a duration of the third sending cycle is from a millisecond range to a second range.

17. The base station according to claim 16, wherein the transmitter is further configured to: send the third DRX monitoring cycle to the terminal in a broadcast manner or a dedicated signaling manner; and/or
send the third DRX monitoring cycle to the core network device in a form of uplink data at a logical link control layer.

18. The base station of claim 9, wherein a duration of the first sending cycle is in a unit of minute or hour and a duration of the second sending cycle is in a unite of millisecond or second.

19. A non-transitory computer-readable storage medium comprising instructions which, when executed by a computer, cause the computer to carry out the method of claim 1.

* * * * *

UNITED STATES PATENT AND TRADEMARK OFFICE
CERTIFICATE OF CORRECTION

PATENT NO. : 11,350,362 B2
APPLICATION NO. : 16/885306
DATED : May 31, 2022
INVENTOR(S) : Yinghui Yu et al.

It is certified that error appears in the above-identified patent and that said Letters Patent is hereby corrected as shown below:

On the Title Page

In item (57), in Column 2, in "Abstract", Line 5, delete "DRX" and insert -- (DRX) --.

In the Claims

In Column 30, Line 59, in Claim 7, delete "unite" and insert -- unit --.

In Column 31, Line 14, in Claim 9, delete "DRX" and insert -- (DRX) --.

In Column 32, Line 45, in Claim 18, delete "unite" and insert -- unit --.

Signed and Sealed this
Sixteenth Day of August, 2022

Katherine Kelly Vidal

Katherine Kelly Vidal
*Director of the United States Patent and Trademark Office*